United States Patent Office.

HENRY C. COFFMAN, OF WASHINGTON COURT-HOUSE, OHIO.

*Letters Patent No. 65,174, dated May 28, 1867.*

IMPROVED FLUID FOR DISINFECTING AND EMBALMING.

*The Schedule referred to in these Letters Patent and making part of the same.*

TO WHOM IT MAY CONCERN:

Be it known that I, HENRY C. COFFMAN, of Washington Court-House, in the county of Fayette, and State of Ohio, have invented a new and useful Disinfecting, Deodorizing, and Embalming Compound; and I hereby declare the following to be a full and exact description thereof.

The ingredients used, and their proportions, are as follows: distilled water, one gallon; carbolic acid, four ounces; nitrate of potash, four ounces; alcohol, four ounces. The different ingredients are mixed together in a suitable vessel, and when properly blended the compound is fit for use. This compound is found very effective in disinfecting and deodorizing a foul or unhealthy atmosphere, by being allowed to evaporate therein. The compound is also used with success in arresting decay in organic substances, by application thereto.

I claim herein as new, and of my invention—

A disinfecting and embalming compound, prepared substantially as described, and for the purposes set forth.

In testimony of which invention I hereunto set my hand.

HENRY C. COFFMAN.

Witnesses:
OLIVER H. SAXTON,
THOS. BENNETT.